July 16, 1968  E. W. TANZBERGER  3,392,910

SEAL

Filed Aug. 23, 1963  3 Sheets-Sheet 1

INVENTOR.
Eric W. Tanzberger
BY
Popp and Sommer
ATTORNEYS

July 16, 1968   E. W. TANZBERGER   3,392,910
SEAL
Filed Aug. 23, 1963   3 Sheets-Sheet 3

INVENTOR.
Eric W. Tanzberger
BY
Popp and Sommer
ATTORNEYS

United States Patent Office 3,392,910
Patented July 16, 1968

1

3,392,910
SEAL
Eric W. Tanzberger, Allegany, N.Y., assignor, by mesne assignments, to the United States of America as represented by the United States Atomic Energy Commission
Filed Aug. 23, 1963, Ser. No. 304,031
15 Claims. (Cl. 230—132)

This invention relates to an improved seal between relatively rotating parts, and more particularly to a seal effective against the escape of fluid through an opening in apparatus including a casing providing a chamber in which relatively high pressure fluid may be confined and having such opening through which a rotary member extends.

The primary object of the present invention is to provide such a seal which has a high degree of effectiveness in preventing the escape of fluid to be confined.

Another object is to provide such a seal which maintains its high degree of effectiveness over a wide variation in environmental temperature which promotes dimensional change of structural parts.

Another object is to provide such a seal which normally has no structural part contacting the rotary member and therefore is not subjected to wear.

A further object is to provide such a seal which is so constructed that even if contact between it and the rotary member occurs it will not be damaged to lose its sealing effectiveness.

A further object is to provide such a seal which is relatively simple in construction.

While the inventive seal may be used in any suitable apparatus, it has particular advantageous application in a centrifugal gas compressor handling a process gas of such nature that it is most important to prevent its escape from the compressor casing along the impeller drive shaft.

An example is a centrifugal compressor used as a helium recirculator in a nuclear plant where the helium gas becomes radioactively contaminated and the sealing problem is rendered particularly difficult because of the low molecular weight of the helium which inherently provides it with high penetrability.

Other objects and advantages of the present invention will be apparent from the following detailed description of a preferred embodiment thereof illustrated as applied to a centrifugal gas compressor in the accompanying drawings wherein.

Figure 1:
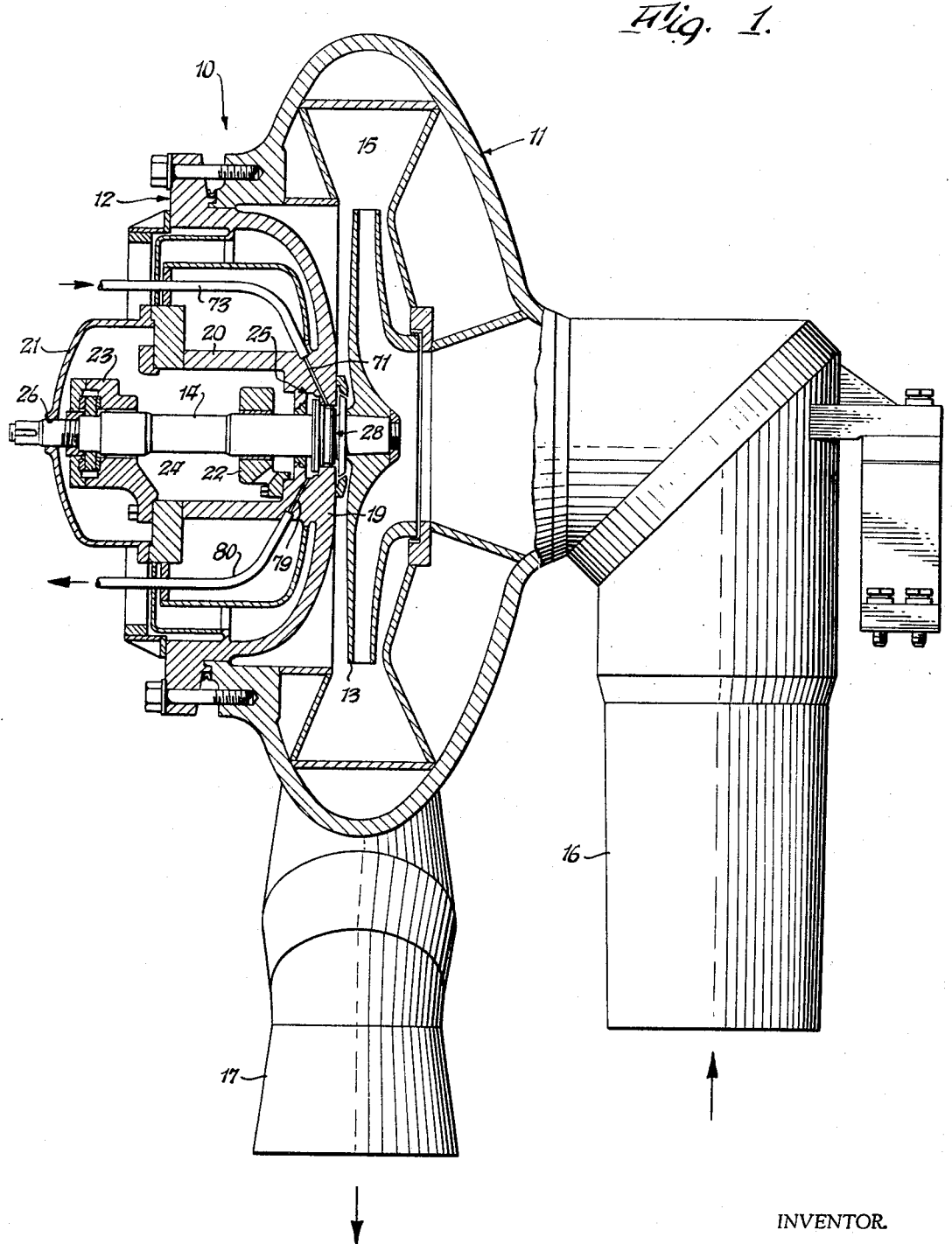
FIG. 1 is a side view of a centrifugal gas compressor, partly in elevation and partly in section, equipped with a seal assembly constructed in accordance with the principles of the present invention.

The centrifugal gas compressor is shown as having a stationary casing represented generally at 10 which includes a housing assembly 11 having an opening on one side which is closed by a removable end head assembly 12. Through this opening is inserable an impeller 13 suitably fastened to one end of a horizontal drive shaft 14. The impeller 13 may be of any suitable construction and is arranged for rotation within a chamber 15 of suitable configuration jointly provided by the housing and end

2 head assemblies 11 and 12 so as to draw gas through an inlet duct 16 and discharge it after being compressed through an outlet duct 17.

The end head assembly 12 is shown as including a seal housing portion 19, a barrel portion 20 extending laterally outwardly therefrom, and a cover 21 closing the outer end of this barrel portion. The impeller shaft 14 is shown as journalled on an inner bearing assembly 22 and an outer thrust and journal bearing assembly 23. These bearing assemblies are arranged within a compartment 24 jointly provided by the parts 19-21 of the end head assembly 12 and are suitably mounted thereon. The impeller drive shaft extends through openings in the members which provide the end walls for the compartment 24. The inner opening, generally designated 25, is provided in the seal housing portion 19. The outer opening is shown at 26 and provided in the cover 21.

The seal assembly of the present invention and represented generally by the numeral 28 is arranged operatively in the opening 25 between the seal housing portion 19 and shaft 14 and is effective against the escape of gas from the impeller chamber 15 through this opening 25.

The seal assembly 28 is shown as including a stationary labyrinth seal ring 29 which surrounds a rotatable sleeve 30 suitably mounted on the rotary shaft 14 so as to rotate therewith and having a cylindrical peripheral surface 31 concentric with the shaft axis. While this shaft sleeve 30 may be mounted in any suitable manner, it is shown as having a pair of axially spaced internal annular ribs 32 and 33 provided with internal cylindrical surfaces engaging external cylindrical surfaces 34 and 35, respectively, provided on the shaft 14. Between these ribs 32 and 33 the shaft sleeve 30 is shown as provided with a pair of diametrically opposed radial holes 37 for a purpose hereinafter explained. The outer end portion 36 of the shaft sleeve 30 is radially thicker and surrounds a cylindrical shaft portion 38 of reduced diameter provided with an annular external groove 39. This sleeve portion 36 is shown as carrying a radially disposed set screw 40 the inner end of which enters the shaft groove 39 so as to prevent relative axial movement between the sleeve 30 and the shaft 14. A key 41 is shown as operatively interposed between the sleeve portion 36 and the shaft portion 38 to prevent relative rotation between the sleeve 30 and the shaft 14. Since the sleeve 30 is thus fixed against both axial and rotative movement relative to the shaft 14 it can be considered a part thereof.

Figure 5:
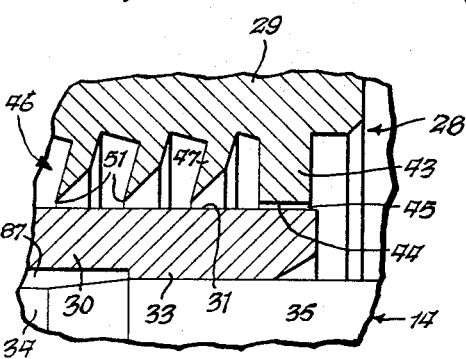
FIG. 5 is a still further enlarged fragmentary longitudinal central sectional view of an end portion of the seal assembly in FIG. 1 and associated compressor parts.

The seal ring 29 is shown as integrally formed on its inside with axially spaced outer and inner annular abutment members 42 and 43, the latter being adjacent the impeller 13. Each of these abutment members 42 and 43 has a radially inwardly facing cylindrical land surface 44 which opposes the radially outwardly facing cylindrical surface 31 on the shaft sleeve 30 and is normally spaced therefrom to provide a clearance indicated typically at 45 in FIG. 5 for the inner abutment member 43. The land surfaces 44 of the two abutment members 42 and 43 are concentric and shown as having the same inside diameter. While the clearance 45 is normally provided between each abutment land surface 44 and the opposing shaft sleeve surface 31, for a purpose hereinafter explained, these surfaces 44 and 31 are adapted to engage each other.

The seal ring 29 is also shown as integrally formed on its inside with axially spaced inner and outer groups of annular labyrinth seal elements arranged between the abutment members 42 and 43. The inner group designated 46 comprises a plurality of annular labyrinth seal elements severally represented at 47, and the outer group designated 49 comprises a plurality of annular labyrinth seal elements severally represented at 50. The seal elements 47 are shown as being similar one to another and in the nature of circular ribs or fins inclined from base to tip in a direction extending radially inwardly and axially outwardly away from the impeller chamber 15. On the other hand, while the seal elements 50 are also shown as circular ribs or fins similar one to another, they are inclined from base to tip in a direction extending radially inwardly and axially inwardly toward the impeller chamber 15. Thus the seal elements in one of the groups 46 or 49 thereof are inclined convergently in a radially inward direction with respect to the seal elements in the other of these groups. Each of the labyrinth seal elements 47 and 50 is shown as having parallel side surfaces with one adjacent its tip margin being tapered toward the other to provide a continuous annular ridge or tip 51 which has a circular configuration when viewed axially and is concentric with the abutment land surfaces 44 and has a comparatively much shorter width in an axial direction. The circular tips 51 of all seal elements 47 and 50 are concentric with each other and have the same diameter.

An important feature of the present invention is that the cylindrical land surface 44 of each of the abutment members 42 and 43 has a much greater width in an axial direction than any of the tips 51 of the labyrinth seal elements 47 and 50.

Another important and related feature of the present invention is that the inside diameter of the land surfaces 44 is no greater than that of the tips 51. In other words, the land surfaces 44 are arranged radially inwardly at least as far as the tips 51. Thus should there be radial displacement of the ring 29 relative to the shaft sleeve 30 so as to bring there two members into contact with each other, the land surfaces 44 will engage the peripheral surface 31 on the shaft sleeve 30 at least as soon as the tips 51 engage such surface 31. If the inside diameter of the land surface 44 is slightly less than that for the tips 51, as may be desired in some applications, it will be seen that the land surface 44 will engage the shaft sleeve surface 31 and prevent contact of the tips 51 with such surface. Radial contact of the ring 29 with the shaft sleeve 30, whether in advance or substantially simultaneously with the seal element tips 51, will prevent damage to these tips. Thus the abutment land surfaces act as bumpers to prevent damage to the tips of the labyrinth seal elements.

Seal means are shown as being operatively interposed between the seal ring 29 and the surrounding casing portion 19 and such means allows relative radial movement therebetween. For this purpose, the ring 29 is shown as provided with a pair of axially spaced outer and inner grooves 52 and 53, respectively. Arranged in the groove 52 is an annular split ring 54. A similar split ring 55 is arranged in the other groove 53. The split rings 54 and 55 are of the piston ring type, variable in circumferential extent and biased radially outwardly into sealing engagement with an opposing surface. In the case of the ring 54, its peripheral surface engages an internal cylindrical surface 56 formed on the annular flange portion 57 of an annular seal housing member 58. The flange portion 57 extends axially inwardly from the radially inner end of the member 58 which is secured to the casing portion 19 by a series of circumferentially spaced cap screws 59 passing through holes provided in the member 58 and having their threaded shank ends received in internally threaded recesses provided in the casing portion 19. In the case of the other split ring 55, its peripheral surface opposes and engages an internal cylindrical surface 60 formed on the casing portion 19, such surface 60 constituting a wall portion of the opening 25. The surfaces 56 and 60 have a radial clearance with the opposing peripheral surface of the seal ring 29. Of course, the member 58 may be eliminated as a separate part so that the surface 56 may also be formed directly on the casing part 19 if desired.

Means are also shown for yieldingly holding the seal ring 29 against radial movement relative to the casing portion 19. For this purpose, the ring 29 is shown as formed to provide a radially outwardly extending integral annular rib 61 having an annular radial surface 62 which faces axially toward the impeller chamber 15. This surface 62 opposes and contacts an axially facing radial surface 63 formed on the member 58. A retainer ring 64 is shown as arranged axially outwardly of the rib 61 and overlaps the same in space relation thereto and is formed to provide an axially and inwardly facing radial surface 65 which opposes and is spaced substantially from an axially outwardly facing radial surface 66 formed on the seal ring 29. In the space provided between the separated surfaces 65 and 66 are arranged spring means which force the surfaces 62 and 63 in contact with each other.

While such spring means may be constructed in any suitable manner, the same is illustrated as an annular leaf spring 68, wider in a radial than an axial direction, and bent back and forth in an axial direction in a uniform undulating manner so as to provide a plurality of alternate salient portions 69 on opposite axial sides of the spring, three such undulations or waves being shown as provided on each axial side. The salients 69 and on one axial side of such wave spring bear against the surface 65 and on the other axial side engage the surface 66. The wave spring 68 is flexed axially when in operative position between the surfaces 65 and 66 and thus preloaded so as to urge the clamp surfaces 62 and 63 into frictional contact with each other.

An annular clearance 67 is shown as provided at all times between the radially outwardly facing surface of the outer end portion of the seal ring 29 and the surrounding inwardly facing surfaces of the spring 68 and retainer ring 64. A similar annular clearance 77 is provided between the opposing radially facing surfaces of the seal ring rib 61 and seal housing member 58. These clearances 77 and 67 permit relative radial movement between the seal ring 29 and casing portion 19.

Figure 3:
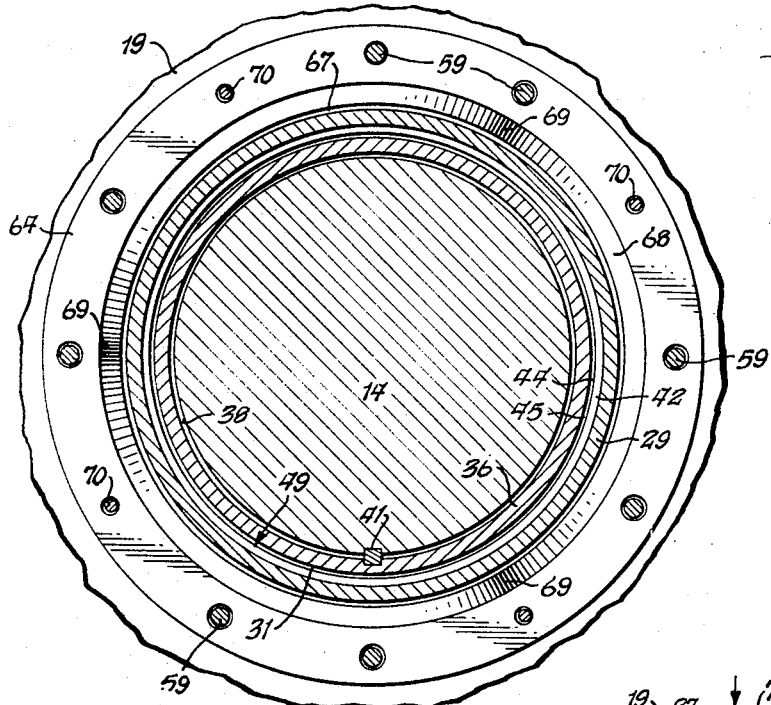
FIG. 3 is a fragmentary transverse sectional view thereof taken on line 3—3 of FIG. 2.

The retainer ring 64 is shown as fastened to the seal housing member 58 by a plurality of flat headed machine screws 70 arranged at circumferentially spaced intervals. The screws 70 pass through openings in the retainer ring 64 and have their threaded shank ends received in internally threaded holes provided in the seal housing member 58. As shown in FIG. 3 such machine screws 70 are arranged on opposite sides of every pair of adjacent cap screws 59, four machine screws 70 and eight cap screws 59 being shown.

A feature of the present invention is that the wave spring 68 effects a frictional contact between the clamp surfaces 62 and 63 which is sufficient to hold the seal ring 29 in an elevated position off the shaft sleeve 30 in order normally to provide the annular clearances 45. In other words, the ring 29 is yieldably held to overcome its gravity effect.

Means are provided for flowing fluid between the tips 51 of the inner group 46 of labyrinth seal elements 47 and the shaft sleeve surface 31 in a direction toward the inner end of such group and into the chamber 15, and also for flowing fluid between the tips 51 of the outer group 49 of labyrinth seal elements 50 in a direction toward the outer end thereof, whereby the ring 29 is fluid filled along the shaft. For this purpose, the casing portion 19 is shown as provided with an inlet passage 71 the inner end of which communicates with the annular space 72 provided between the axially spaced outer and inner split rings 54 and 55, respectively. The outer end of this inlet passage 71 is suitably connected to a supply conduit 73 which leads to any suitable source (not shown) of pressurized fluid suitable to be used for sealing purposes.

Figure 4:
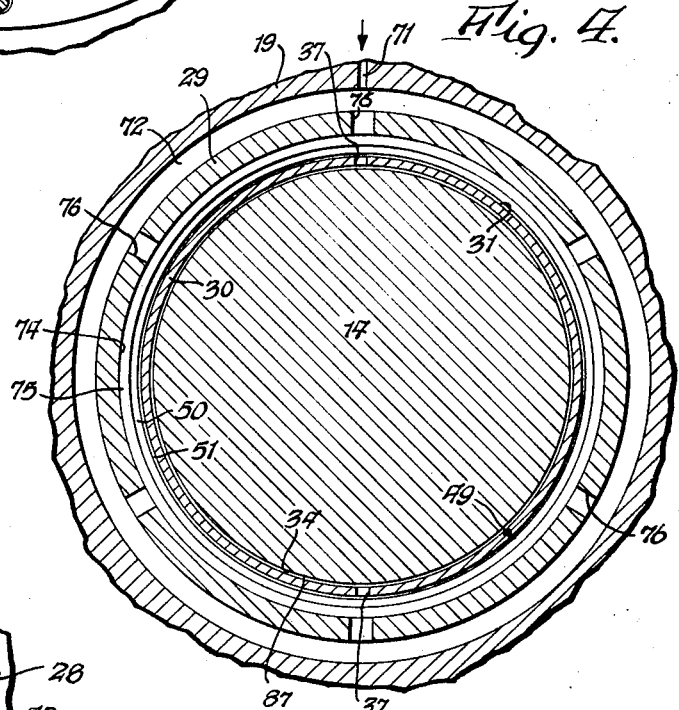
FIG. 4 is a fragmentary transverse sectional view thereof taken on line 4—4 of FIG. 2.

Further, the ring 29 is shown as provided with an internal annular groove 74 between the axially spaced labyrinth seal groups 46 and 49 to provide the annular space 75 therebetween. As best shown in FIG. 4, the ring 29 is also shown as provided with a series of radial through passages 76 arranged at circumferentially spaced intervals, six such passages being shown. These passages 76 establish communication between the radially outer annular space 72 and the radially inner annular space 75. This space 75 also communicates with the outer ends of the shaft sleeve holes 37 the inner ends of which communicate with an annular space 87 provided by the radial clearance between the shaft surface 34 and internal surface of the sleeve 30 between the internal ribs 32 and 33 thereof.

Figure 2:
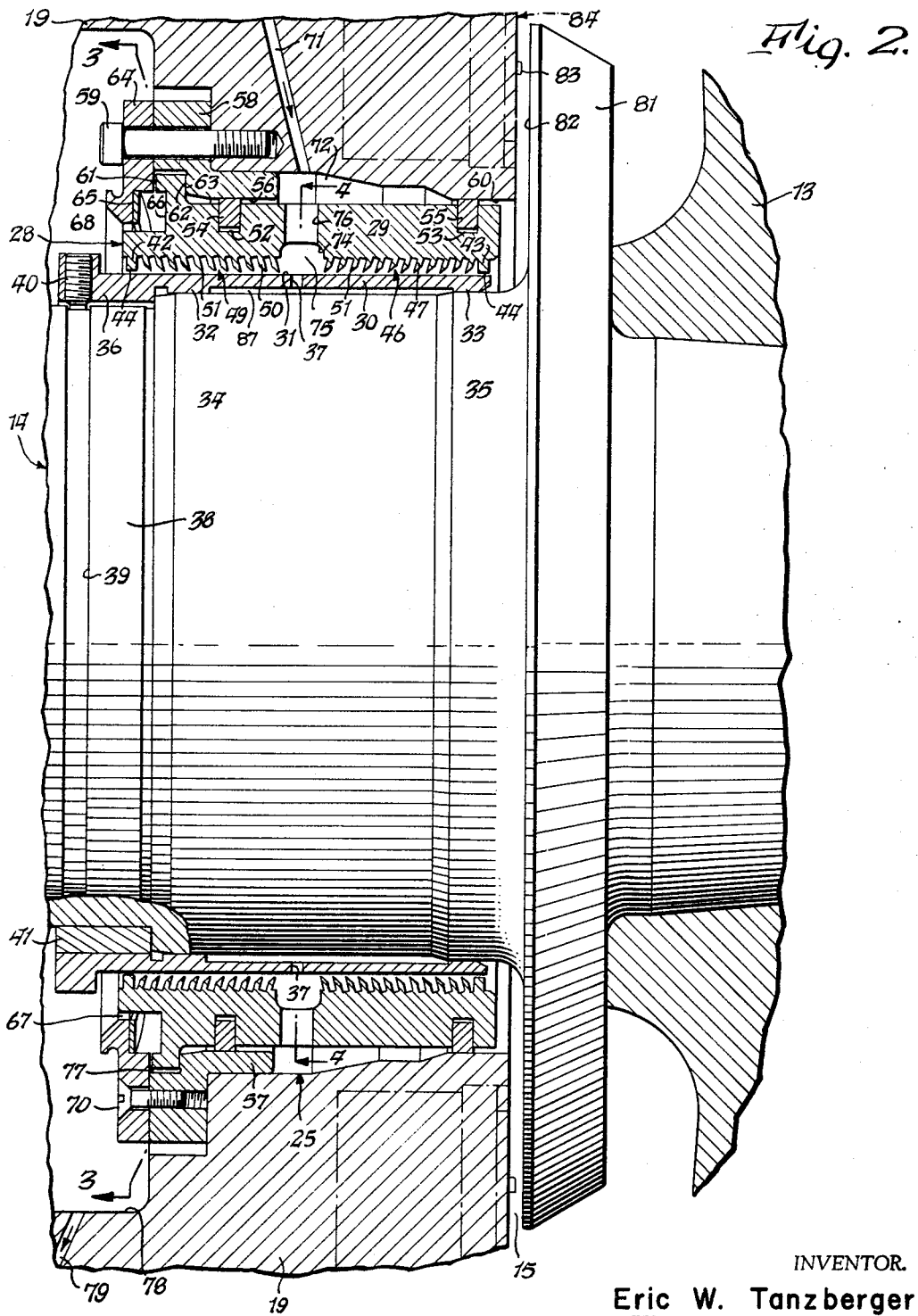
FIG. 2 is an enlarged fragmentary longitudinal central sectional view of the seal assembly shown in FIG. 1 and associated compressor parts.

Fluid which flows inwardly or to the right as viewed in FIG. 2 passes the tips of the labyrinth seal elements 47 and flows through the clearance 45 at the inner abutment member 43 to enter the impeller chamber 15. Fluid which flows outwardly or to the left passes the tips of the labyrinth seal elements 50 and flows through the clearance 45 at the outer abutment member 42 to enter a drain compartment 78 which has an outlet passage 79 formed in the casing portion 19. The outer end of this drain passage 79 is shown as being suitably connected in fluid conducting communication with a drain conduit 80 which leads to any suitable receptacle (not shown) in which a desired back pressure may be maintained for a purpose hereinafter explained. Likewise, any axially outward leakage of fluid from the space 87 past sleeve rib 32 enters drain compartment 78 and any axially inward leakage of fluid from this space past sleeve rib 33 escapes into impeller chamber 15.

Another important feature of the present invention is that the labyrinth seal ring 29 is constructed of a metallic material having a higher thermal coefficient of expansion than that of the metallic material of which the shaft sleeve 30 and shaft 14 are constructed. This tends to maintain substantially the normal intended radial clearances 45 between the parts 29 and 30 even though there is a wide difference in the temperatures of these parts. If the parts were made of the same material or of materials having substantially the same coefficient of expansion, the shaft sleeve 30 which gets hotter than the seal ring 29, as more fully explained later herein, would cause these parts to seize each other causing destruction of the seal assembly 28 if the shaft were continued to be rotated.

Referring to FIG. 2, the impeller shaft 14 is shown as having a radially outwardly extending annular continuous flange 81 provided with an axially and outwardly facing radial side face 82 adapted to be engaged by the annular movable element 83 of a bellows seal assembly indicated generally at 84, these parts 83 and 84 being phantomly illustrated. The purpose of this assembly 84 is to cause contact of the element 83 with the side face 82 to effect a sealed engagement when the compressor is shut down. However, since this shut down seal assembly 84 forms no part of the present invention, further explanation of the details of its construction and operation are not given.

While other seal means may be provided between the compressor shaft and casing and arranged axially outwardly of the inventive seal assembly 28, such additional seal means have not been illustrated since they form no part of the present invention.

*Operation*

The operation of the inventive seal assembly 28 in the illustrated application of the same to a centrifugal gas compressor is believed to be best explained by assuming typical figures as to temperature and pressures and with the process gas handled by the compressor being considered specifically as helium. Thus, let it be assumed that the impeller shaft 14 is being driven by a prime mover (not shown) and that the compressor is connected in a system in which the helium process gas is being circulated, such that the pressure of the gas in the impeller chamber 15 is about 350 pounds per square inch (hereinafter referred to as p.s.i.).

Let it further be assumed that the labyrinth seal ring 29 with its integral abutment members and labyrinth seal elements is constructed of an alloy composed principally of aluminum such as Alcoa type A 750 specified by Aluminum Company of America and having a coefficient of expansion of $13 \times 10^{-6}$ inch per degree F., and that the shaft 14 and its sleeve 30 are constructed of an alloy composed principally of iron such as AISI type 410 stainless steel specified by American Iron and Steel Institute and having a coefficient of expansion of $7 \times 10^{-6}$ inch per degree F.

It is further assumed that the radial clearances 45 between the opposing abutment land surfaces 44 and shaft sleeve surface 31 is from about 0.003 inch to about 0.005 inch, and further that the radially inward overlap, if any, of the abutment land surfaces 44 with respect to the labyrinth seal elements tips 51 does not exceed about 0.002 inch. These dimensions are given purely for illustrative purposes, considering the nature of the rotary apparatus and the specific type of process gas being handled together with its temperature and pressure.

Let it further be assumed that helium seal gas is fed from any suitable source through the inlet conduit 73 such that the pressure of this seal gas in the inner annular space 75 is about 353 p.s.i., and that a back pressure in the drain compartment 78 is suitably maintained at a pressure of about 352 p.s.i. It will thus be seen that there exists a pressure differential across the inner labyrinth seal group 46 of about 3 p.s.i. to cause flow of seal gas toward the impeller chamber 15, and that a pressure differential of about 1 p.s.i. is developed across the outer labyrinth seal group 49 to cause a flow of seal gas axially outwardly away from the impeller chamber 15. It will also be noted that the pressure at any point along the axial extent of the labyrinth seal assembly is at a higher pressure than that which obtains within the impeller chamber 15. Typically, the flow of helium seal gas axially inwardly over the inner labyrinth seal group 46 is 120 standard cubic feet per minute (hereinafter referred to as c.f.m.) and the flow of helium seal gas axially outwardly over the outer labyrinth seal group 49 is about 60 standard c.f.m. The labyrinth seal ring is thus gas filled along the shaft and hence gas lubricated.

Inasmuch as the annular space 87 between the shaft 14 and its sleeve 30 is also filled with seal gas at a higher pressure than the pressure of gas in either the impeller chamber 15 or the drain compartment 78, if the contacts between the sleeve ribs 32 and 33 and corresponding shaft surfaces 34 and 35 are not gas tight, seal gas will leak axially from the space 87 into this chamber and compartment. Thus again as is desired, process gas is prevented from leaking axially outwardly from the impeller chamber 15.

It will also be noted that the annular space 72 between the seal ring 29 and the surrounding casing is filled with seal gas at a higher pressure than the pressure of gas in either chamber 15 or compartment 78. Since the piston type seal rings 54 and 55 will allow some leakage as a practical matter, it will be in the proper direction, namely, past ring 55 toward chamber 15 to block escape of process gas therefrom and past ring 54 to be collected in drain compartment 78. In this latter connection, the leaking seal gas flows between the contacting surfaces 62 and 63 which also as a practical matter would be ineffective to prevent gas flow therebetween. The communicating clearances between the various parts downstream of the surfaces 62 and 63 would conduct the leaking gas ultimately to drain compartment 78.

The helium seal gas is supplied at say room temperature and hence is relatively cool as compared to the process gas in the impeller chamber which may be assumed to be at a temperature of somewhere between 600 and 700° F. Thus the seal gas flowing through the annular spaces 72, 75 and 87 connected by the radial passages 76 and 37 will tend to cool the ring 29. On the other hand, the shaft portion including the sleeve 30 surrounded by the seal ring 29 will absorb heat from the process gas and therefore may be at a temperature in the range of from 600 to 700° F. in the assumed example. A substantial temperature difference therefore exists between the parts 29 and 30. Since the shaft with its sleeve 30 is constructed of a material having a lower coefficient of expansion than that of the material of which the ring 29 is composed, the original intended radial clearances 45 between the opposing surfaces of the abutment members 42, 43 and the sleeve 30 will be substantially maintained even though the temperature of the seal ring 29 is substantially below that of the shaft sleeve 30. In other words, while the ring 29 is cooler it has a higher coefficient of expansion, as compared with the shaft sleeve 30 which has a higher temperature and a lower coefficient of expansion.

The opposing axially facing surfaces 62 and 63 provided between the seal ring 29 and surrounding seal housing member 58, the latter in effect being part of the compressor casing, serve as clamp or clutch surfaces having frictional contact maintained by the pressure of the wave spring 68. Since these surfaces 62 and 63 are radial there can be relative radial movement between the ring 29 and the surrounding casing, the clearances 67 and 77 permitting of this. It is intended that the wave spring 68 will have a spring rate such that it will exert sufficient force between the surfaces 62 and 63 to develop a frictional contact at least adequate to support the weight of the ring 29 and the associated parts mounted thereon such as the split seal rings 54 and 55. Thus the ring 29 may be radially supported on the casing so as to have clearances 45 between it and the shaft sleeve 30 around the full circumference of this sleeve. In the event temperature changes produce dimensional growth radially or even distortion of the shaft and its sleeve 20 so as to effect intermittent or continuous contact with the seal ring 29, it will be seen that the brunt of such contact will be taken by the abutment land surfaces 44 engaging the shaft sleeve surface 31. Should such contact between the seal ring 29 and the shaft sleeve 30 be sufficiently forceful to displace the seal ring in a radial direction, this can take place because the clamp surfaces 62 and 63 will slide one on the other to permit of this. Also, it will be seen that such radial shift in the position of the seal ring 29 relative to the surrounding compressor casing will be accommodated by the split seal rings 54 and 55 sliding in their respective grooves 52 and 53 while maintaining effective sealing engagement with the surrounding casing parts.

While the inventive seal assembly 28 has been described in its illustrated application as sealing against the lakage of a gaseous process fluid and employing a gaseous seal fluid of the same type, it will be understood that the process and seal fluids may be specifically different gases if this is considered desirable for any reason. Generally speaking, the higher the molecular weight of the seal and process gases, everything else being equal, the greater may be the normal radial clearances 45, and vice versa. Of course, if considered suitable in a given application of the seal assembly 28, either or both of the process and seal fluids may be liquid.

From the foregoing, it will be seen that the seal assembly of the present invention accomplishes the various objects stated. Since modifications and changes in the construction of the seal assembly and the apparatus with which it is associated may occur to those skilled in the art, the embodiment shown and described is intended to be illustrative and not limitative of the present invention the scope of which is to be measured by the appended claims.

What is claimed is:

1. In apparatus including a casing providing a chamber in which a relatively high pressure fluid may be confined and having an opening through which a rotary member extends, the combination therewith of means to seal against the escape of fluid through said opening comprising a ring arranged within said opening and surrounding said rotary member, annular labyrinth seal elements on the inside of said ring and extending radially inwardly toward said rotary member, abutment elements on the inside of said ring at opposite axial ends of said seal elements and extending radially inwardly at least as far as said seal elements to provide land surfaces opposing said rotary member and normally spaced therefrom but adapted to engage the same, and seal means operatively interposed between said ring and casing.

2. In apparatus including a casing providing a chamber in which a relatively high pressure fluid may be confined and having an opening through which a rotary member extends, the combination therewith of means to seal against the escape of fluid through said opening comprising a ring arranged within said opening and surrounding said rotary member, annular labyrinth seal elements on the inside of said ring and extending radially inwardly toward said rotary member, abutment elements on the inside of said ring at opposite axial ends of said seal elements and extending radially inwardly at least as far as said seal elements to provide land surfaces opposing said rotary member and normally spaced therefrom but adapted to engage the same, seal means operatively interposed between said ring and casing and allowing relative radial movement therebetween, and means yieldably holding said ring against radial movement relative to said casing.

3. In apparatus including a casing providing a chamber in which a relatively high pressure fluid may be confined and having an opening through which a rotary member extends, the combination therewith of means to seal against the escape of fluid through said opening comprising a ring arranged within said opening and surrounding said rotary member, annular labyrinth seal elements on the inside of said ring and extending radially inwardly toward said rotary member, abutment elements on the inside of said ring at opposite axial ends of said seal elements and extending radially inwardly at least as far as said seal elements to provide land surfaces opposing said rotary member and normally spaced therefrom but adapted to engage the same, and seal means operatively interposed between said ring and casing and including split ring means variable in circumferential extent.

4. In apparatus including a casing providing a chamber in which a relatively high pressure fluid may be confined and having an opening through which a rotary member extends, the combination therewith of means to seal against the escape of fluid through said opening comprising a ring arranged within said opening and surrounding said rotary member, annular labyrinth seal elements on the inside of said ring and extending radially inwardly toward said rotary member, abutment elements on the inside of said ring at opposite axial ends of said seal elements and extending radially inwardly at least as far as said seal elements to provide land surfaces opposing said rotary member and normally spaced therefrom but adapted to engage the same, and seal means operatively interposed between said ring and casing and including means providing an annular groove in one of said rings and casing and a split ring variable in circumferential extent arranged in said groove and biased radially into sealing engagement with the other of said ring and casing.

5. In apparatus including a casing providing a chamber in which a relatively high pressure fluid may be confined and having an opening through which a rotary member extends, the combination therewith of means to seal against the escape of fluid through said opening comprising a ring arranged within said opening and surrounding said rotary member, annular labyrinth seal elements on the inside of said ring and extending radially inwardly toward said rotary member, abutment elements on the inside of said ring at opposite axial ends of said seal elements and extending radially inwardly at least as far as said seal elements to provide land surfaces opposing said rotary member and normally spaced therefrom but adapted to engage the same, and seal means operatively interposed between said ring and casing and including first and second split ring means severally variable in circumferential extent and spaced from each other axially of said ring.

6. In apparatus including a casing providing a chamber in which a relatively high pressure fluid may be confined and having an opening through which a rotary member extends, the combination therewith of means to seal against the escape of fluid through said opening comprising a ring arranged within said opening and surrounding said rotary member, annular labyrinth seal elements on the inside of said ring and extending radially inwardly toward said rotary member, abutment elements on the inside of said ring at opposite axial ends of said seal elements and extending radially inwardly at least as far as said seal elements to provide land surfaces opposing said rotary member and normally spaced therefrom but adapted to engage the same, seal means operatively interposed between said ring and casing and allowing relative radial movement therebetween, and means yieldably holding said ring against radial movement relative to said casing and including axially facing and opposing surfaces on said ring and casing and means urging said surfaces into frictional contact with each other.

7. In apparatus including a casing providing a chamber in which a relatively high pressure fluid may be confined and having an opening through which a rotary member extends, the combination therewith of means to seal against the escape of fluid through said opening comprising a ring arranged within said opening and surrounding said rotary member, annular labyrinth seal elements on the inside of said ring and extending radially inwardly toward said rotary member, abutment elements on the inside of said ring at opposite axial ends of said seal elements and extending radially inwardly at least as far as said seal elements to provide land surfaces opposing said rotary member and normally spaced therefrom but adapted to engage the same, seal means operatively interposed between said ring and casing and allowing relative radial movement therebetween, and means yieldably holding said ring against radial movement relative to said casing and including first and second pairs of axially facing and opposing surfaces on said ring and casing and spring means operatively interposed between said surfaces in one of said pairs for urging said surfaces in the other of said pairs into frictional contact with each other.

8. In apparatus including a casing providing a chamber in which a relatively high pressure fluid may be confined and having an opening through which a rotary member extends, the combination therewith of means to seal against the escape of fluid through said opening comprising a ring arranged within said opening and surrounding said rotary member, annular labyrinth seal elements on the inside of said ring and extending radially inwardly toward said rotary member, abutment elements on the inside of said ring at opposite axial ends of said seal elements and extending radially inwardly at least as far as said seal elements to provide land surfaces opposing said rotary member and normally spaced therefrom but adapted to engage the same, and seal means operatively interposed between said ring and casing, said ring being constructed of a material having a higher coefficient of expansion than that for the material of which said rotary member is constructed.

9. In apparatus including a casing providing a chamber in which a relatively high pressure fluid may be confined and having an opening through which a rotary member extends, the combination therewith of means to seal against the escape of fluid through said opening comprising a ring arranged within said opening and surrounding said rotary member, annular labyrinth seal elements on the inside of said ring and extending radially inwardly toward said rotary member, abutment elements on the inside of said ring at opposite axial ends of said seal elements and extending radially inwardly at least as far as said seal elements to provide land surfaces opposing said rotary member and normally spaced therefrom but adapted to engage the same, and seal means operatively interposed between said ring and casing, said ring being constructed of an alloy composed principally of aluminum and said rotary member being constructed of an alloy composed principally of iron.

10. In apparatus including a casing providing a chamber in which a relatively high pressure fluid may be confined and having an opening through which a rotary member extends, the combination therewith of means to seal against the escape of fluid from said chamber through said opening comprising a ring arranged within said opening and surrounding said rotary member, axially spaced abutment members on the inside of said ring and each having a radially inwardly facing land surface opposing and normally spaced from said rotary member but adapted to engage the same, inner and outer groups of annular labyrinth seal elements on the inside of said ring and having tips extending radially inwardly toward said rotary member no farther than said land surfaces, means for flowing fluid between the tips of said inner group and said rotary member toward the inner end of said inner group and also for flowing fluid between the tips of said outer group toward the outer end thereof whereby said ring is fluid filled along said shaft, and seal means operatively interposed between said ring and casing and allowing radial movement therebetween.

11. In apparatus including a casing providing a chamber in which a relatively high pressure fluid may be confined and having an opening through which a rotary member extends, the combination therewith of means to seal against the escape of fluid from said chamber through said opening comprising a ring arranged within said opening and surrounding said rotary member, axially spaced abutment members on the inside of said ring and each having a radially inwardly facing land surface opposing and normally spaced from said rotary member but adapted to engage the same, axially spaced inner and outer groups of annular labyrinth seal elements on the inside of said ring and having tips extending radially inwardly toward said rotary member no farther than said land surfaces, means for flowing fluid between the tips of said inner group and said rotary member toward the inner end of said inner group and into said chamber and also for flowing fluid between the tips of said outer group toward the outer end thereof whereby said ring is fluid filled along said shaft, such last means including means for supplying fluid to the space between said groups at a pressure higher than that of the fluid confined within said chamber and means providing a drain chamber at said outer end of said outer group to receive the fluid flowing past the tips thereof and having an outlet, and seal means operatively interposed between said ring and casing and allowing relative radial movement there between.

12. In apparatus including a casing providing a chamber in which a relatively high pressure fluid may be confined and having an opening through which a rotary member extends, the combination therewith of means to seal against the escape of fluid from said chamber through said opening comprising a ring arranged within said opening and surrounding said rotary member, an inner group of annular labyrinth seal elements on the inside of said ring and inclined from base to tip in a direction extending radially inwardly and axially outwardly away from said chamber, an outer group of annular labyrinth seal elements on the inside of said ring and inclined from base to tip in a direction extending radially inwardly and axially inwardly toward said chamber, the opposing end seal elements of said groups being axially spaced from each other, an inner annular abutment member on the inside of said ring and adjacent the innermost seal element of said inner group, an outer annular abutment member on the inside of said ring and adjacent the outermost seal element of said outer group, each of said abutment members having a land surface of greater width in an axial direction than any of the tips of said seal elements and arranged radially inwardly at least as far as said tips and opposing and normally spaced from said rotary member but adapted to engage the same, means for supplying fluid to the space between said groups at a pressure higher than that of the fluid confined within said chamber, and seal means operatively interposed between said ring and casing and allowing relative radial movement therebetween.

13. In apparatus including a casing providing a chamber in which a relatively high pressure fluid may be confined and having an opening through which a rotary member extends, the combination therewith of means to seal against the escape of fluid from said chamber through said opening comprising a ring arranged within said opening and surrounding said rotary member, axially spaced inner and outer annular abutment members on the inside of said ring and each having a radially inwardly facing land surface opposing and normally spaced from said rotary member but adapted to engage the same, axially spaced inner and outer groups of annular labyrinth seal elements on the inside of said ring and having tips extending radially inwardly toward said rotary member no farther than said land surfaces, seal means operatively interposed between said ring and casing and allowing radial movement therebetween and including axially spaced inner and outer split ring means severally variable in circumferential extent, and means for supplying fluid to the space between said groups at a pressure higher than that of the fluid confined within said chamber and including conduit means communicating with the space between said split ring means and passage means in said ring establishing communication between said spaces.

14. In a gas compressor including a casing, a shaft journalled on said casing and an impeller arranged within said casing and fast to said shaft, the combination therewith of means to seal against the escape of process gas from said casing along said shaft comprising a cylindrical surface on said shaft, a ring surrounding said shaft surface, a pair of axially spaced abutment members on the inside of said ring and each having a radially inwardly facing cylindrical land surface opposing and normally spaced from said shaft surface but adapted to engage the same, axially spaced inner and outer groups of circular labyrinth seal elements arranged on the inside of said ring between said abutment members and having cylindrical tips opposing said shaft surface, the seal elements in one of said groups being inclined convergently in a radially inward direction with respect to the seal elements in the other of said groups, the inside diameter of said land surfaces being no greater than that of said tips, means for supplying to the space between said groups seal gas of the same type as said process gas but a higher pressure whereby a pressure differential is developed across said inner group to cause flow of seal gas toward said impeller, and seal means operatively interposed between said ring and casing and allowing radial movement therebetween.

15. In a gas compressor including a casing, a horizontal shaft journalled on said casing and an impeller arranged within said casing and fast to said shaft, the combination therewith of means to seal against the escape of process gas from said casing along said shaft comprising a cylindrical surface on said shaft, a ring surrounding said shaft surface, a pair of axially spaced abutment members on the inside of said ring and each having a radially inwardly facing cylindrical land surface opposing and normally spaced from said shaft surface to provide a clearance but adapted to engage the same, axially spaced inner and outer groups of circular groups of circular labyrinth seal elements arranged on the inside of said ring between said abutment members and having cylindrical tips opposing said shaft surface, the seal elements in one of said groups being inclined convergently in a radially inward direction with respect to the seal elements in the other of said groups, the inside diameter of said land surfaces being no greater than that of said tips, means for supplying to the space between said groups seal gas of the same type as said process gas but at a lower temperature and higher pressure whereby said ring is cooled and a pressure differential is developed across said inner group to cause flow of seal gas toward said impeller, said ring being constructed of a material having a higher coefficient of expansion than that for the material of which said shaft is constructed whereby said clearance is substantially maintained even though said shaft has a higher temperature than that of said ring, seal means operatively interposed between said ring and casing and allowing relative radial movement therebetween, said ring and casing having axially facing and opposing clamp surfaces, and means urging said clamp surfaces together with sufficient force such that the frictional contact therebetween is adequate to overcome the gravity effect of said ring.

References Cited
UNITED STATES PATENTS

| | | | |
|---|---|---|---|
| 1,720,696 | 7/1929 | Simpson | 277—53 |
| 1,986,706 | 1/1935 | Beger | 103—111 |
| 2,543,615 | 2/1951 | Trumpler | 277—53 |
| 3,155,395 | 11/1964 | Hoffman | 253—77 |

HENRY F. RADUAZO, *Primary Examiner.*

MARK NEWMAN, BENJAMIN A. BORCHELT,
*Examiners.*